United States Patent
Zimmerman et al.

(10) Patent No.: US 11,729,181 B2
(45) Date of Patent: Aug. 15, 2023

(54) PLUGGABLE SECURITY DEVICES AND SYSTEMS INCLUDING THE SAME

(71) Applicant: MELLANOX TECHNOLOGIES, LTD., Yokneam (IL)

(72) Inventors: Shy Zimmerman, Kibutz Magal (IL); Gil Levy, Hod Hasharon (IL); Zachy Haramaty, Hemed (IL); Andrey Ger, Shlomi (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 157 days.

(21) Appl. No.: 17/098,986

(22) Filed: Nov. 16, 2020

(65) Prior Publication Data

US 2022/0159013 A1 May 19, 2022

(51) Int. Cl.
*H04L 9/40* (2022.01)
*H04L 12/46* (2006.01)
*H04L 69/22* (2022.01)

(52) U.S. Cl.
CPC ........ *H04L 63/123* (2013.01); *H04L 12/4633* (2013.01); *H04L 63/0485* (2013.01); *H04L 63/20* (2013.01); *H04L 69/22* (2013.01); *H04L 2212/00* (2013.01)

(58) Field of Classification Search
CPC ... H04L 63/123; H04L 63/0485; H04L 63/20; H04L 69/22; H04L 12/4633; H04L 2212/00

USPC .......................................................... 726/2
See application file for complete search history.

(56) References Cited

U.S. PATENT DOCUMENTS

| | | | |
|---|---|---|---|
| 2009/0187770 A1* | 7/2009 | Cao ...................... | H04L 9/3271 713/193 |
| 2010/0042689 A1* | 2/2010 | Doggett .............. | H04L 63/0218 709/206 |
| 2012/0216273 A1* | 8/2012 | Rolette ................. | G06F 21/577 726/13 |
| 2013/0262856 A1* | 10/2013 | Moshfeghi .............. | H04L 9/065 713/155 |
| 2017/0170927 A1* | 6/2017 | Stone .................... | H04L 1/0041 |

* cited by examiner

*Primary Examiner* — Michael S McNally
(74) *Attorney, Agent, or Firm* — Sheridan Ross P.C.

(57) ABSTRACT

A networking system includes a pluggable security device comprising at least one port interface that is insertable into at least one physical port, memory that stores a security key used to provide security over a network link, and processing circuitry coupled with the at least one port interface and with the memory. The processing circuitry utilizes the security key to verify security of a point-to-point connection established over the network link and after verifying the security of the point-to-point connection, provides a data integrity check function for data packets received at the at least one port interface.

12 Claims, 6 Drawing Sheets

PLUGGABLE SECURITY DEVICES AND SYSTEMS INCLUDING THE SAME

FIELD OF THE DISCLOSURE

The present disclosure is generally directed pluggable security devices and systems including the same, and more particularly, to pluggable security devices that encrypt and/or decrypt data.

BACKGROUND

Data security standards are often employed to ensure secure and reliable communication between devices over a network. One such industry standard for securing communication is the 802.1AE Media Access Control Security (MACsec) standard, which provides point-to-point security for communication between devices. In general, the hardware and/or software that implements MACsec standard(s) are integrated into a network switch or network interface card (NIC), which is costly and inhibits functionality.

BRIEF SUMMARY

In an illustrative embodiment, a networking system includes a pluggable security device comprising at least one port interface that is insertable into at least one physical port, memory that stores a security key used to provide security over a network link, and processing circuitry coupled with the at least one port interface and with the memory. The processing circuitry utilizes the security key to verify security of a point-to-point connection established over the network link and after verifying the security of the point-to-point connection, provides a data integrity check function for data packets received at the at least one port interface.

In another illustrative embodiment, a method for securing data packet communication using a pluggable security device includes receiving, by a first port interface of the pluggable security device, a first data packet from a first physical port of a network device connected to the first port interface, applying a security protocol to the first data packet to form a second data packet, and sending the second data packet to the network device through the first port interface and the first physical port or through a second port interface of the pluggable security device and a second physical port of the network device connected to the second port interface.

In another illustrative embodiment, a pluggable security device includes a first connector configured to electrically and mechanically connect to a first receiving portion of a network device, a second connector configured to electrically and mechanically connect to a second receiving portion of the network device, and processing circuitry. The processing circuitry applies an encryption/decryption protocol to data that secures the data over a point-to-point connection, operates the pluggable security device in a first mode to send and receive both encrypted data and unencrypted data through only the first connector and the first receiving portion, operates the pluggable security device in a second mode to send and receive encrypted data through only the first connector and the first receiving portion, and to send and receive unencrypted data and through only the second connector and the second receiving portion.

Additional features and advantages are described herein and will be apparent from the following description and the figures.

BRIEF DESCRIPTION OF THE DRAWINGS

The present disclosure is described in conjunction with the appended figures, which are not necessarily drawn to scale.

DETAILED DESCRIPTION

Figure 1:
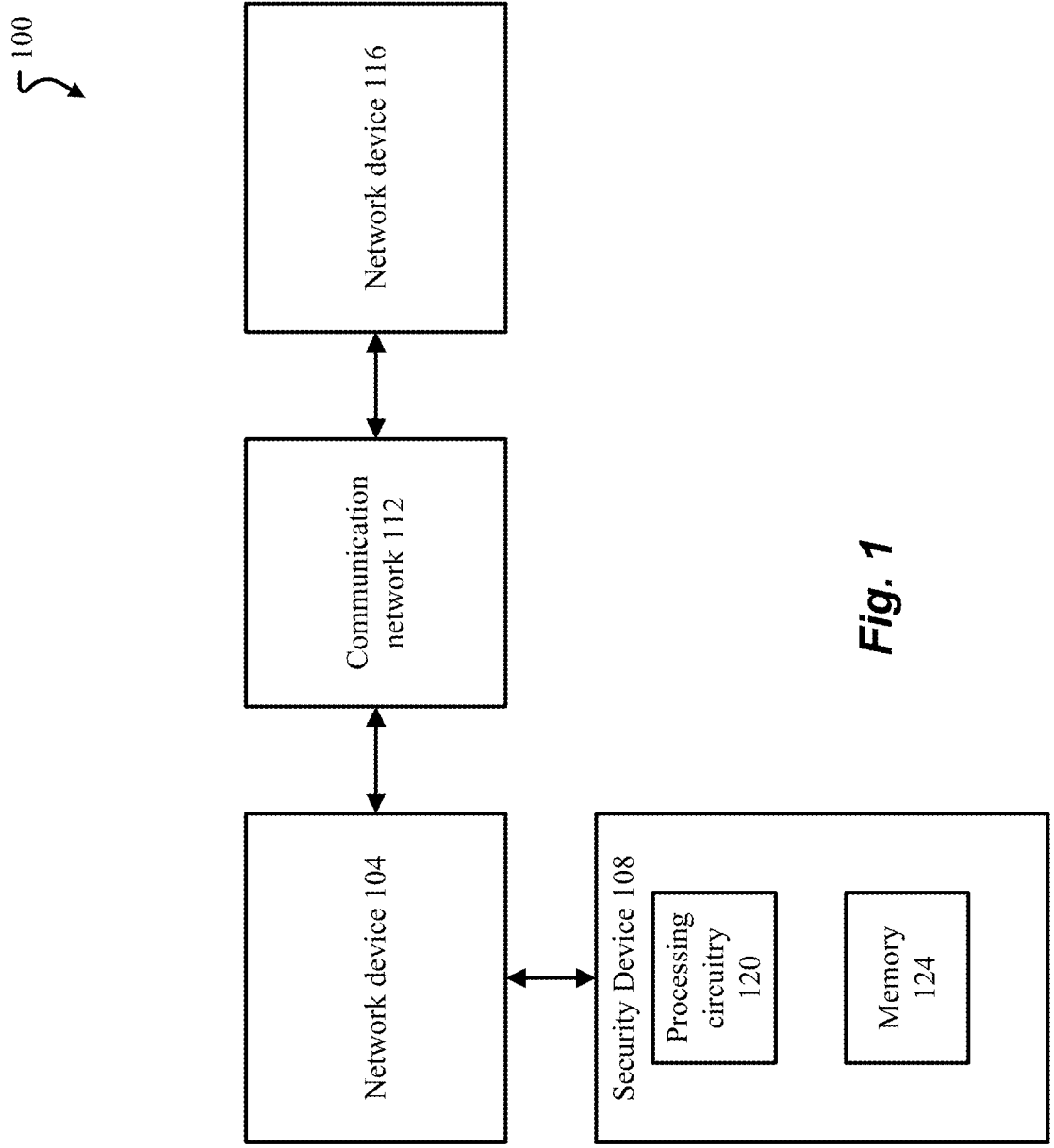
FIG. 1 illustrates a system according to at least one example embodiment.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Inventive concepts are directed to pluggable security devices or modules. Example embodiments are discussed below with respect to double quad small form factor pluggable (QSFP) devices, but inventive concepts are not limited thereto and are also applicable for other pluggable form factor interfaces (e.g., OSFP, OSFP-RHS, QSFP-DD, SFP, DSFP, SFP-DD, SFP). In at least one example embodiment, a pluggable security device implements a version of the MACsec standard and associated protocols and is usable as a MACsec lookaside instead of a bump in the data path. The lookaside feature enables offloading of MACsec encryption/decryption from the network switch and transforms non-MACsec devices to MACsec-capable devices. The lookaside feature further enables the switch to perform additional operations (e.g., tunneling encapsulation such as virtual extensible local area network VXLAN) on MACsec encrypted data prior to transmission from the network switch. The pluggable security device may be managed by firmware and/or software of the switch using existing interfaces of the switch.

In at least one example embodiment, the pluggable security device is a two-port device that is capable of being plugged into two physical receiving ports of a network switch. Consider the following example where the network switch includes at least a first logical port and a second logical port. For data transmission, unencrypted data may flow to the pluggable security device through the first logical port of the network switch connected to the pluggable security device, and then the data is encrypted by the pluggable security device before flowing out of the pluggable security device and through the second logical port of the network switch connected to the pluggable security device. For received encrypted data, the encrypted data flows to the pluggable security device through the second logical port of the network switch connected to the security device and then the data is decrypted by the pluggable security device before flowing out of the first logical port of the network switch connected to the pluggable security device. The first and second logical ports of the network switch may be implemented on a single connector that connects with the pluggable security device or on two separate connectors that connect with the pluggable security device. Whether the first and second logical ports are implemented on a single connector or separately on multiple connectors depends on the speed capabilities of the network switch and the pluggable security device. In any event, the pluggable security device may have the same number of logical ports and/or connectors as the portion of the network switch that connects to the pluggable security device.

For the example described above, the network switch and pluggable security device may be operable in multiple modes. For example, in a first mode, the second logical port of the network switch handles remote flow control and has a large receive buffer. In this mode, flow control is needed between the first logical port of the network switch and the pluggable security device and between the pluggable security device and the second logical port. In a second mode where data traverses the first logical port, the pluggable security device, and the second logical port, flow control is not needed. In this mode, the first logical port adds gaps between data packets (e.g., an extra 24 B or 32 B) to accommodate MACsec added info when encrypting. When the second logical port receives an XOFF packet, the second logical port passes the packet on to the pluggable security device and then to the first logical port so that the first logical port handles the flow control. For sending XOFF packets, the first logical port instructs the second logical port to send the XOFF packet or the first logical port sends the XOFF packet un-encrypted through the pluggable security device and the second logical port.

FIG. 1 illustrates a system 100 according to at least one example embodiment. The system 100 includes a network device 104, a security device 108, a communication network 112, a network device 116. In at least one example embodiment, network devices 104 and 116 may correspond a network switch (e.g., an Ethernet switch), a NIC, or any other suitable device used to control the flow of data between devices connected to communication network 112. Each network device 104 and 116 may be connected to one or more of Personal Computer (PC), a laptop, a tablet, a smartphone, a server, a collection of servers, or the like.

Examples of the communication network 112 that may be used to connect the network devices 104 and 116 include an Internet Protocol (IP) network, an Ethernet network, an InfiniBand (IB) network, a Fibre Channel network, the Internet, a cellular communication network, a wireless communication network, combinations thereof (E.g., Fibre Channel over Ethernet), variants thereof, and/or the like. In one specific, but non-limiting example, the communication network 112 is a network that enables communication between the network devices 104 and 116 using Ethernet technology.

Figure 5A:
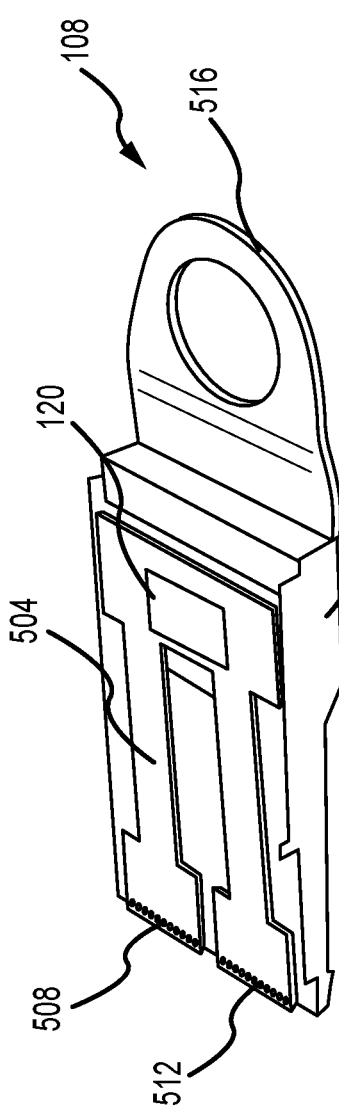
FIGS. 5A to 5C illustrate various perspective views of an example structure for a security device according to at least one example embodiment.
Figure 5B:
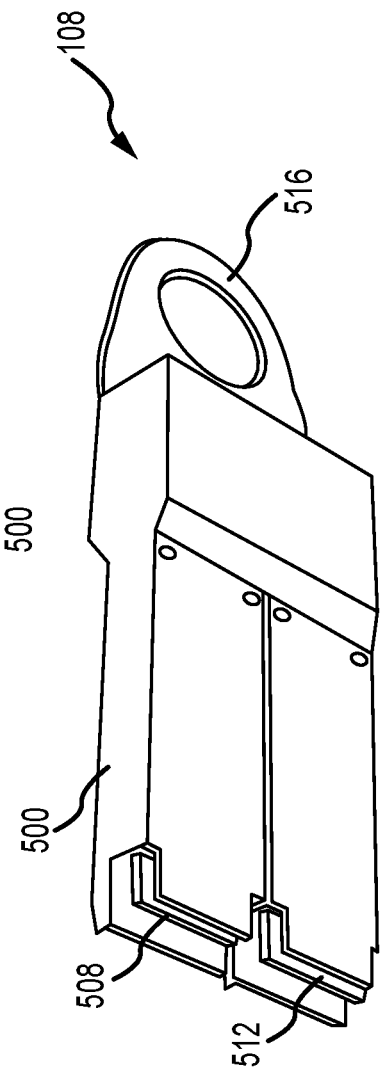
Figure 5C:
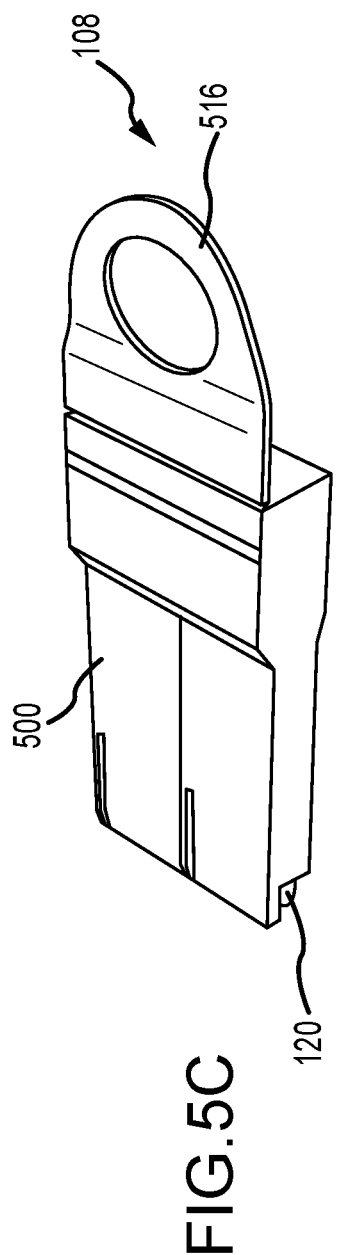

The security device 108 may provide encryption and decryption capabilities for data flowing through the network device 104. The security device 108 may be pluggable. That is, the security device 108 may be removed from and inserted into the network device 104 as desired. FIGS. 5A to 5C illustrate an example structure for such a pluggable security device 108. The security device 108 includes processing circuitry 120 and a memory 124 that enables the security device 108 to encrypt and decrypt data for the network device 104. In one specific, but non-limiting embodiment, the processing circuity 120 encrypts and decrypts data in accordance with MACsec protocols. However, example embodiments are not limited thereto, and the processing circuitry 120 may be capable of providing data security according one or more additional or alternative protocols.

The memory 124 may store data for the security device 108. For example, the memory 124 may serve as a buffer for incoming and outgoing encrypted and unencrypted data. In at least one example embodiment, the memory stores a security key that is used by the security device 108 to provide security over the communication network 112. The security key may be any suitable key for securing data in accordance with the MACsec standards. For example, the security key is a key that enables a static connectivity association key (CAK) mode, a static secure association key (SAK) mode, or a dynamic SAK mode. Non-limiting examples of the memory 124 include Flash memory, Random Access Memory (RAM), Read Only Memory (ROM), variants thereof, combinations thereof, or the like.

The processing circuitry 120 may comprise software, hardware, or a combination thereof. For example, the processing circuitry 120 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 120 may comprise hardware, such as an application specific integrated circuit (ASIC). Other non-limiting examples of the processing circuitry 120 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 120 may be provided on a Printed Circuit Board (PCB) or collection of PCBs. It should be appreciated that any appropriate type of electrical component or collection of electrical components may be suitable for inclusion in the processing circuitry 120.

Although not explicitly shown, it should be appreciated that the network device 104 and/or the network device 116 may include other storage devices and/or processing circuitry for carrying out computing tasks, for example, tasks associated with controlling the flow of data over the communication network 112. It should be further understood that such processing circuity may take the form of hardware and/or software in the same or similar manner as the processing circuitry 120.

In addition, although not explicitly shown, it should be appreciated that the network devices 104 and 116 and the security device 108 include one or more communication interfaces for facilitating wired and/or wireless communication between one another and other unillustrated elements of the system 100.

Figure 2:
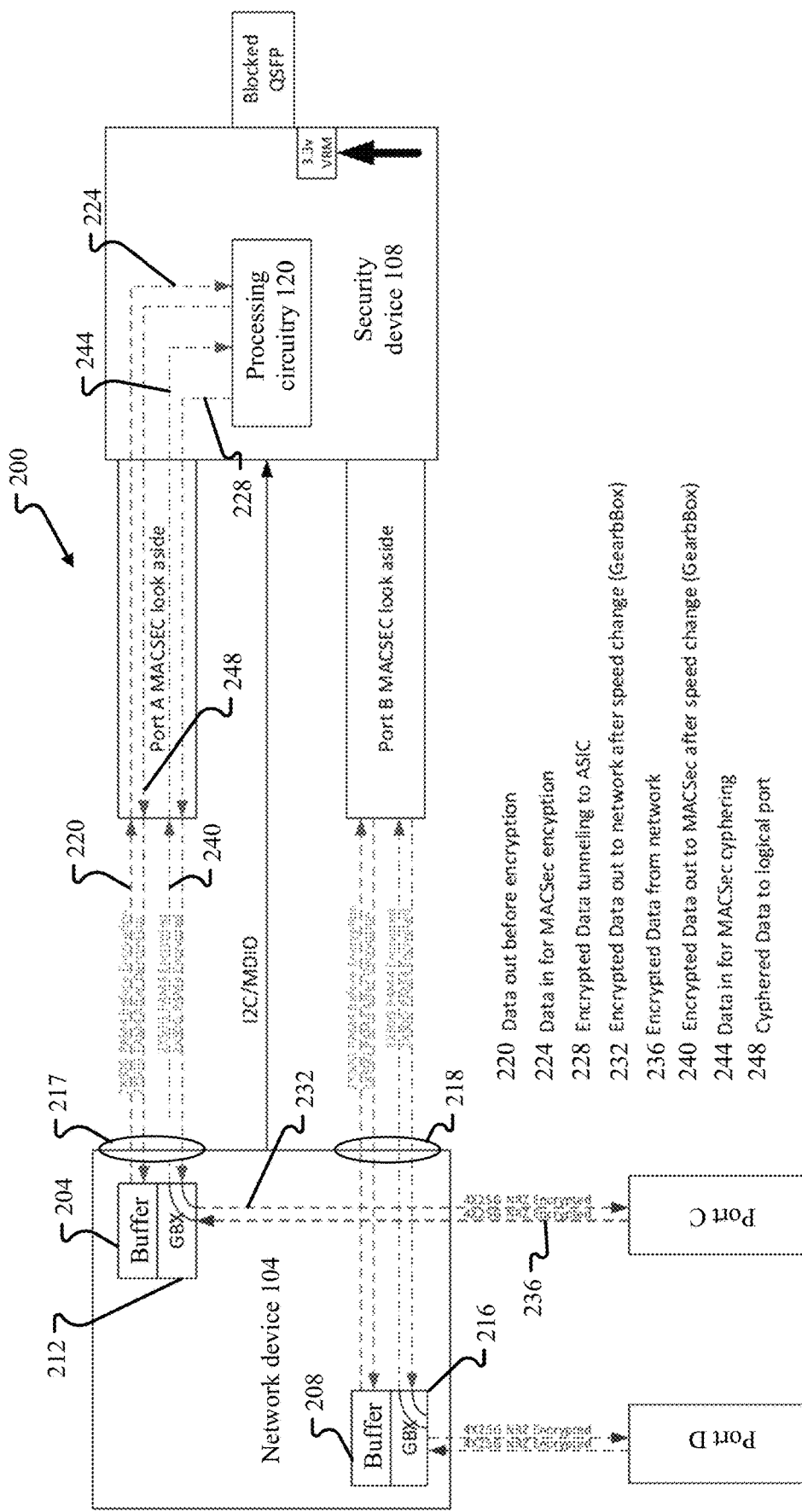
FIG. 2 is a block diagram that illustrates an example data flow within the system of FIG. 1 according to at least one example embodiment.

FIG. 2 is a block diagram that illustrates an example data flow 200 within the system 100 of FIG. 1 according to at least one example embodiment. As shown, the security device 108 includes two physical ports or connectors, port A and port B, for exchanging data with the network device 104 while the network device 104 includes two physical 2×100 G ports, port C and port D, that send and receive data to and from the communication network 112. The network device 104 further includes physical ports 217 and 218, where port 217 electrically and mechanically connects with port A of the security device 108 and where port 218 electrically and mechanically connects with port B of the security device 108.

As shown in FIG. 2, the network device 104 includes buffers 204 and 208 for holding data. The network device 104 further includes gearboxes 212 and 216, which are capable of adjusting the rate of data transmission up or down, which may involve translating NRZ encrypted data received from the communication network 112 to PAM4 encrypted data and translating PAM4 encrypted data to NRZ encrypted data for transmission over the communication network 112. Here, it should be appreciated that gearbox 212 and/or gearbox 216 may be included in the security device 108 instead of the network device 104 if desired.

Here, it should be appreciated that in the event the network device 104 is a network switch, then in general, a port in the switch may be referred to as a switch port. In this case, ports A and B of the network device 104 correspond to switch ports that are connected to the communication network 112, and ports 217 and 218 correspond to switch ports that are connected to the security device 108. For each switch port of the network switch that is connected to the network 112 and that uses a security function, the network switch 104 may include two additional switch ports connected to the security device 108 (e.g., one switch port for flow of encrypted data and one switch port for flow of decrypted data. In some cases, the lanes between the network switch 104 and the security device 108 may operate with increased speed (e.g., double the speed) of a switch port connected to the communication network 112. As such, two switch ports connected between the network switch and the security device 108 may consume the same number of lanes as a single switch port connected to the communication network 112. This is valuable as lanes and/or serial/deserializers (SerDes) are limited on the network switch integrated circuit.

FIG. 2 further illustrates that the security device 108 includes a 3.3 v voltage regulator module (VRM) to provide power for the processing circuitry 120, and that further connection to the QSFP interface is blocked. In addition, the network device 104 and the security device 108 communicate with one another via $I^2C$ interfaces or Management data input/output (MDIO) interfaces depending on the form factor.

The data flow 200 will now be described with reference to the various stages shown in FIG. 2. The data flow 200 initially begins with data that is intended for transmission from the network device 104 over the communication network 112. As such, stage 220 illustrates the network device 104 sending unencrypted 2×50 G PAM4 data from the network device 104 to the processing circuitry 120 through port 217 of the network device 104 and through port A of the security device 108. Here, it should be appreciated that data exchanged between the network device and the security device 108 (i.e., data sent in stages 220, 224, 228, 240, 244, and 248) may be 2×50 G PAM4 data (i.e., two lanes at 50 Gbps per lane with PAM4 coding), while data exchanged with the communication network 112 may 4×25 G NRZ data (i.e., data in stages 232 and 236 and exchanged using four lanes at 25 Gbps per lane with NRZ coding).

Stage 224 illustrates the data from stage 220 being input to the processing circuitry 120 for MACsec encryption.

Subsequent to encryption, the data is output from the processing circuitry 120 in stage 228 as encrypted data to the gearbox 212 (which may be as ASIC) through port A of the security device 108 and port 217. The gearbox 212 adjusts the speed of the encrypted data for transmission by translating the 2×50 G PAM4 encrypted data into 4×25 G NRZ encrypted data. Then, in stage 232, the 4×25 G NRZ encrypted data is sent to the communication network 112 through port C of the network device 104.

Stages 236 to 248 relate to the network device 104 and the security device 108 receiving data from the communication network 112. As shown, 4×25 G NRZ encrypted data is received from the network 112 through port C of the network device 104 in stage 236. In particular, the 4×25 G NRZ encrypted data is received at the gearbox 212 where the 4×25 G NRZ encrypted data is translated to 2×50 G PAM4 encrypted data. In stage 240, the 2×50 G PAM4 encrypted data is sent to the processing circuitry 120 through port 217 and through port A of the security device 108. The 2×50 G PAM4 encrypted data sent in stage 240 through port 217 is input to the processing circuitry 120 in stage 244. The data received in stage 244 is decrypted or deciphered by the processing circuity 120, and then output as unencrypted 2×50 G PAM4 data to the buffer 204 in stage 248 through port A of the security device and port 217. The unencrypted 2×50 G PAM4 data may then sent to a logical port of a host device or other computing device connected to the network device 104.

Here, it should be appreciated that FIG. 2 has been described with respect to transmit, receive, encode, and decode operations through port C of the network device, port 217, and port A of the security device 108. However, it should be understood that the same stages apply to port D of the network device 104, port 218, and port B of the security device 108. That is, data is transmitted, received, encoded, and decoded through port D of the network device 104, port 218, and port B of the security device 108 in the same manner as that described above for port C of the network device 104, port 217, and port A of the security device 104.

FIG. 2 illustrates an example where port A of the security device 108 is a single physical port (or connector) that connects to a single physical port (or connector) 217 of the network device 104. In this example, it should be appreciated that in the example of FIG. 2 port A and port 217 each comprise two logical ports, one logical port for sending and receiving decrypted data in stages 220 and 248 and one logical port for sending and receiving encrypted data in stages 228 and 240. As shown in FIG. 2, each physical port A and port 217 has four total lanes, and each logical port within port A and port 217 consumes two lanes of the four lanes. This configuration is possible because the transmission rate capabilities between the network device 104 and the security device 108 are double the transmission rate capabilities between the network device 104 and the communication network 112. Thus, the network security device 108 provides MACsec security functions for two ports C and D of the network device 104.

Figure 3:
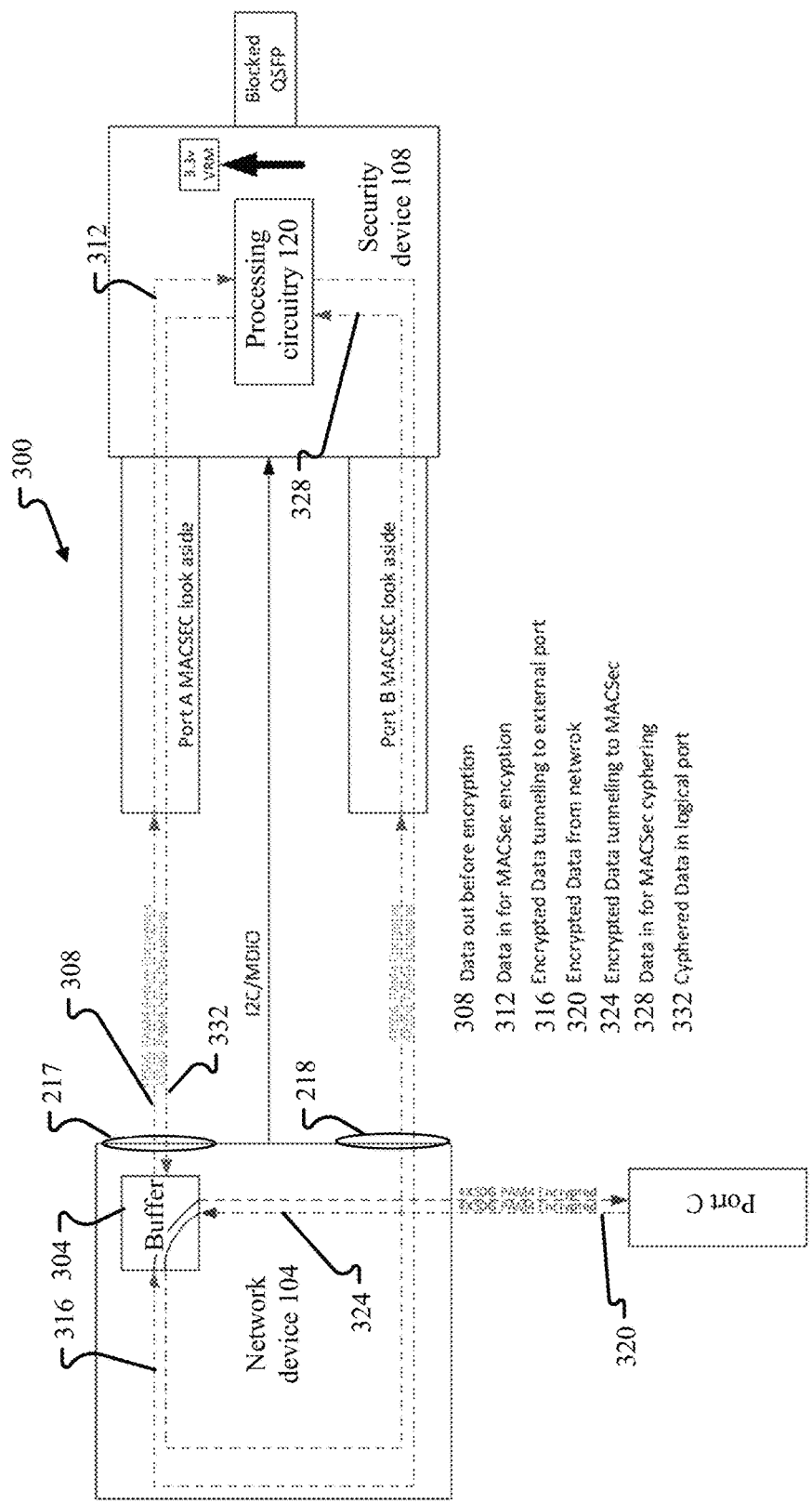
FIG. 3 is a block diagram that illustrates an example data flow within the system of FIG. 1 according to at least one example embodiment.

FIG. 3 is a block diagram that illustrates an example data flow 300 within the system 100 of FIG. 1 according to at least one example embodiment. As shown, the network device 104 in FIG. 3 is the same as that shown in FIG. 2 except that in FIG. 3, the network device includes a single buffer 304 for storing data and a single port C that connects to the communication network 112. FIG. 3 illustrates an example where port C of the network device 104 is a 1×200 G port. The structure of the security device 108 is the same as that shown in FIG. 2, and thus, a description thereof is not repeated here. Compared to FIG. 2, the transmission rate capabilities between the network device 104 and the security device 108 matches the transmission rate capabilities between the network device 104 and the communication network 112. Thus, FIG. 3 illustrates that each of ports 217, 218, A, and B comprise a single logical port where the security device 108 provides MACsec security functions for only one port C of the network device 104. In addition, the gearbox(es) of FIG. 2 are not in use or omitted for the configuration of FIG. 3 (and FIG. 4).

The data flow 300 will now be described with reference to the various stages shown in FIG. 3. The data flow 300 initially begins with data that is intended for transmission from the network device 104 over the communication network 112. As such, stage 308 illustrates the network device 104 sending unencrypted 4×50 G PAM4 data from the network device 104 to the processing circuitry 120 through port 217 of the network device 104 and through port A of the security device 108. In stage 312, the unencrypted 4×50 G PAM4 data is input to the processing circuitry 120 and encrypted according to MACsec protocols.

In stage 316, encrypted 4×50 G PAM4 data is sent through port B of the security device 108 and port 218 of the network device 104 to buffer 304. From the buffer 304, the encrypted 4×50 G PAM4 data is sent through port C of the network device 104 over the communication network 112.

Stages 320 to 332 relate to receiving encrypted 4×50 G PAM4 data from the communication network 112. In stage 320, encrypted 4×50 G PAM4 data is received through port C of the network device 104. In stage 324, the encrypted 4×50 G PAM4 data is input to the buffer 304 and passed through port 218 and port B of the security device 108. In stage 328, the encrypted 4×50 G PAM4 data is input to the processing circuitry 120 for decryption.

In stage 332, the now unencrypted 4×50 G PAM4 data is sent from the processing circuitry 120 to the buffer 304 through port A of the security device 108 and port 217 of the network device 104. The unencrypted 4×50 G PAM4 data is now available for retrieval by a host device or other computing device connected to the network device 104.

Here, it should be appreciated that FIG. 3 illustrates an example where the network device 104 and the security device 108 have dedicated ports that pass only encrypted data or only unencrypted data. In the example of FIG. 3, port 217 of the network device 104 and port A of the security module 108 pass only unencrypted data while port 218 of the network device 104 and port B of the security module 108 pass only encrypted data.

Figure 4:
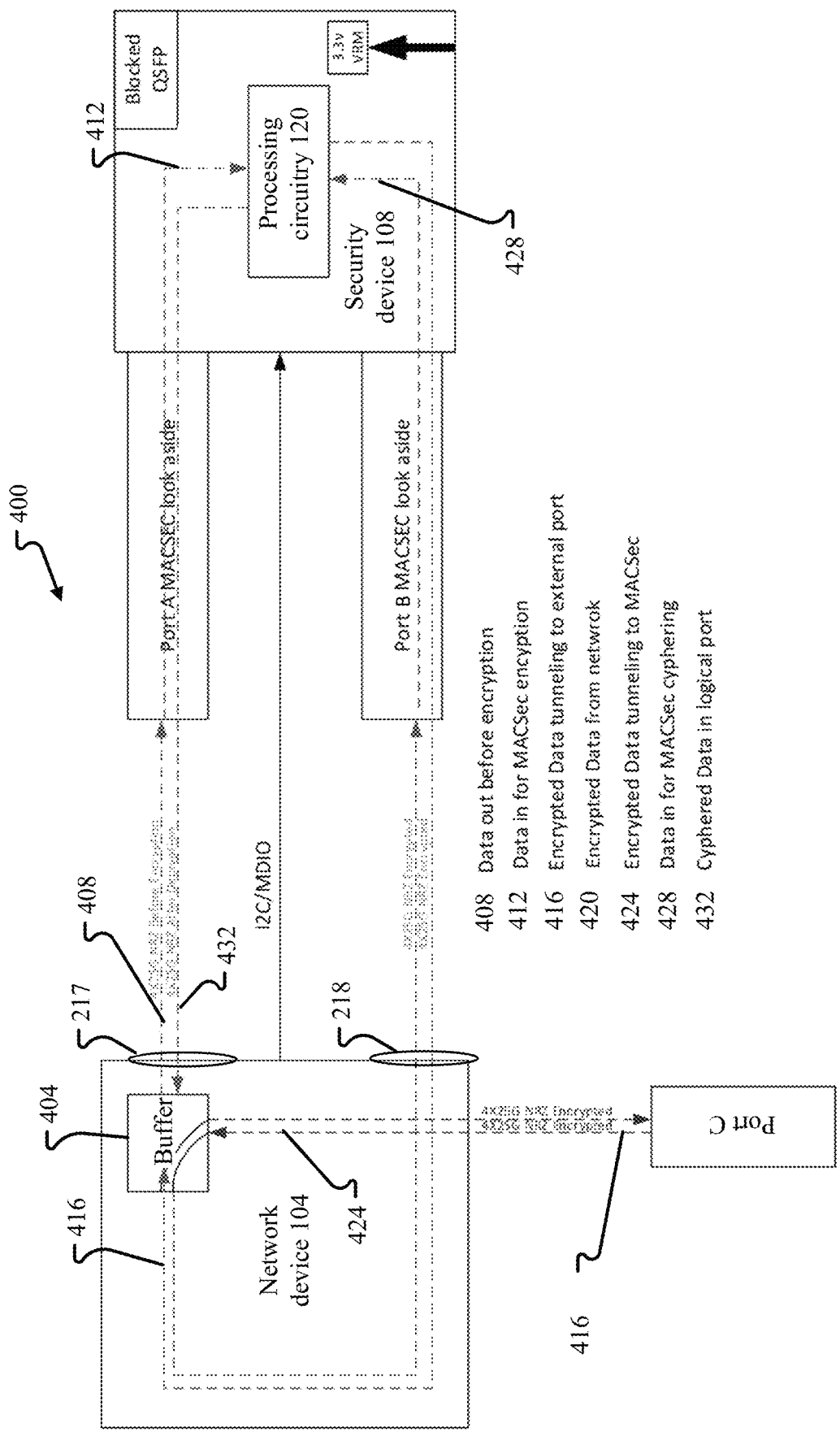
FIG. 4 is a block diagram that illustrates an example data flow within the system of FIG. 1 according to at least one example embodiment.

FIG. 4 is a block diagram that illustrates an example data flow 400 within the system 100 of FIG. 1 according to at least one example embodiment. As shown, the network device 104 in FIG. 3 is the same as that shown in FIG. 2 except that in FIG. 4, the network device 104 includes a single buffer 404 for storing data and a single port C that connects to the communication network 112. FIG. 4 illustrates an example where port C of the network device 104 is a 1×100 G port. FIG. 4 illustrates a similar configuration to FIG. 3 in that transmission rate capabilities between the network device 104 and the security device 108 match the transmission rate capabilities between the network device 104 and the communication network 112 so that the security device 108 provides MACsec security functions for only one port C of the network device 104. The structure of the security device 108 is the same as that shown in FIG. 2, and thus, a description thereof is not repeated here.

The data flow 400 will now be described with reference to the various stages shown in FIG. 4. The data flow 400 initially begins with data that is intended for transmission from the network device 104 over the communication network 112. As such, stage 408 illustrates the network device 104 sending unencrypted 4×25 G NRZ data from the network device 104 to the processing circuitry 120 through port 217 of the network device 104 and through port A of the security device 108. In stage 412, the unencrypted 4×25 G NRZ data is input to the processing circuitry 120 and encrypted according to MACsec protocols.

In stage 416, encrypted 4×25 G NRZ data is sent through port B of the security device 108 and port 218 of the network device 104 to buffer 404. From the buffer 404, the encrypted 4×25 G NRZ data is sent through port C of the network device 104 over the communication network 112.

Stages 420 to 432 relate to receiving encrypted 4×25 G NRZ data from the communication network 112. In stage 420, encrypted 4×25 G NRZ data is received through port C of the network device 104. In stage 424, the encrypted 4×25 G NRZ data is input to the buffer 404 and passed through port 218 and port B of the security device 108. In stage 428, the encrypted 4×25 G NRZ data is input to the processing circuitry 120 for decryption.

In stage 432, the now unencrypted 4×25 G NRZ data is sent from the processing circuitry 120 to the buffer 404 through port A of the security device 108 and port 217 of the network device 104. The unencrypted 4×25 G NRZ data is now available for retrieval by a host device or other computing device connected to the network device 104.

Here, it should be appreciated that like FIG. 3, FIG. 4 illustrates an example where the network device 104 and the security device 108 have dedicated ports that pass only encrypted data or only unencrypted data. In the example of FIG. 4, port 217 of the network device 104 and port A of the security module 108 pass only unencrypted data while port 218 of the network device 104 and port B of the security module 108 pass only encrypted data.

FIGS. 5A to 5C illustrate various perspective views of an example structure for a security device 108 according to at least one example embodiment. FIG. 5A illustrates a bottom perspective view of the security device 108 with a partial housing, FIG. 5B illustrates a bottom perspective view of the security device 108 with a complete housing, and FIG. 5C illustrates a top perspective view of the security device 108.

With reference to FIGS. 5A to 5C, the security device 108 includes a housing 500, a PCB 504, a first connector 508, a second connector 512, and a handle 516. The connectors 508 and 512 may also be referred to as ports or port interfaces throughout the instant description. The view in FIG. 5A does not illustrate the bottom of the housing 500 in order to reveal the approximate location of the processing circuitry 120, which may be mounted to or formed on the unillustrated side of the PCB 504. The two connectors 508 and 512 may be integrated with the PCB 504 such that the PCB 504 has a U-like shape where each connector 508 and 512 is a leg of the U-shape while the processing circuitry 120 is located at a bottom of the U-shape between each leg. The unillustrated side of the PCB 505 may further include electrical traces for carrying data to and from the processing circuitry 120. The number and arrangement of the traces may be set according to design preferences. As shown, each leg of the U-shaped PCB 504 may include a wider section near the connectors 508 and 512 and a thinner section leading from the wider section to the bottom of the U-shape with the processing circuitry 120. As further shown, each leg of the U-shape remains spaced apart from the other leg until reaching the bottom of the U-shape.

As shown in FIGS. 5A to 5C, the housing 500 encases the PCB 504 on five sides. The housing 500 includes an opening at the end of the PCB 504 with the connectors 508 and 512 to allow for electrical and mechanical connection to a corresponding port or port interface of the network device 104. The electrical connection may be between electrical contacts on the connectors 508 and 512 and corresponding electrical contacts on the ports 217 and 218 of the network device 104. The mechanical connection may be achieved between the connectors 508 and 512 and corresponding ports 217 and 218 by means of any suitable mechanical connection for connectors in electronics which may include, but is not limited to, snap fit, friction or force fit, and/or any other suitable connection for a network switch or NIC. The handle 516 is located at an end of the housing 500 opposite the end with the connectors 508 and 512 and facilitates removal and insertion of the security device 108 from and into the network device 104.

Example embodiments have been described with respect to a two port A and B security device 108 that is insertable into and removable from two corresponding ports 217 and 218 of the network device 104. However, example embodiments are not limited thereto, and more or fewer physical ports may be included if desired. For example, the security device 108 may have a single physical port that electrically and mechanically connects to a single physical port of the network device 104. In that case, the data flow may look the same or similar to the data flow described above for FIG. 2 where each single physical port includes two logical ports. In another example, the security device 108 may include more than two physical ports, for example, three or four ports that electrically and mechanically connect to a corresponding number of physical ports of the network device 104. The number of physical ports and/or logical ports of the system is adjustable according to design preferences.

With reference to FIGS. 1 to FIG. 5C, it should be appreciated that example embodiments provide a networking system including a pluggable security device 108. The pluggable security device 108 includes at least one port interface (port A and/or port B) that is insertable into at least one physical port (e.g., port 217 and/or port 218 of the network device 104). The pluggable security device includes a memory 124 that stores a security key used to provide security over a network link 112. The pluggable security device includes processing circuitry 120 coupled with the at least one port interface and with the memory 124. The processing circuitry 120 utilizes the security key to verify security of a point-to-point connection established over the network link and after verifying the security of the point-to-point connection, provides a data integrity check function for data packets received at the at least one port interface of the network device 104.

The networking system further includes the at least one physical port of the network device 104. In at least one example, the at least one physical port of the network device 104 comprises a first physical port 217 and a second physical port 218. Further, the at least one port interface of the pluggable security device 108 includes first port interface A and a second port interface B. The first port interface A of the pluggable security device 108 plugs into the first physical port 217 of the network device 104, and the second port interface B of the pluggable security device 108 plugs into the second physical port 218 of the network device 104. The data packets traverse both the first physical port 217 and the second physical port 218 of the network device 104.

In at least one example embodiment, the processing circuitry 120 provides the data integrity check function by appending a header to all data packets traversing the point-to-point connection established over the network link 112 in accordance with MACsec standard. For example, the processing circuitry 120 provides the data integrity check function by inspecting a header of all data packets traversing the point-to-point connection established over the network link. The processing circuitry 120 further encrypts or decrypts data packets traversing the point-to-point connection established over the network link 112. In at least one example embodiment, the network link comprises an Ethernet link or an Infiniband link. In at least one example embodiment, the at least one physical port is provided in a network switch (e.g., the network device 104 is a network switch). In at least one other example embodiment, the at least one physical port is provided in a Network Interface Card (NIC) (e.g., the network device 104 is a NIC). As shown in the figures, the networking system may further include a gearbox that adjusts a data transmission rate for data packets between the pluggable security device 108 and the network link 112.

In view of FIGS. 1-5C, example embodiments provide a pluggable security device 108 that includes a first connector 508 configured to electrically and mechanically connect to a first receiving portion 217 of a network device 104. The pluggable security device 108 includes a second connector 512 configured to electrically and mechanically connect to a second receiving portion 218 of the network device 104. The pluggable security device 108 includes processing circuitry 120 to apply an encryption/decryption protocol to data that secures the data over a point-to-point connection, operate the pluggable security device 108 in a first mode to send and receive both encrypted data and unencrypted data through only the first connector 508 and the first receiving portion 217, and operate the pluggable security device 108 in a second mode to send and receive encrypted data through only the first connector 508 and the first receiving portion 217, and to send and receive unencrypted data and through only the second connector 512 and the second receiving portion 218. In at least one example embodiment, the encryption/decryption protocol is MACsec protocol, and the point-to-point connection is established with an Ethernet link over communication network 112.

Figure 6:
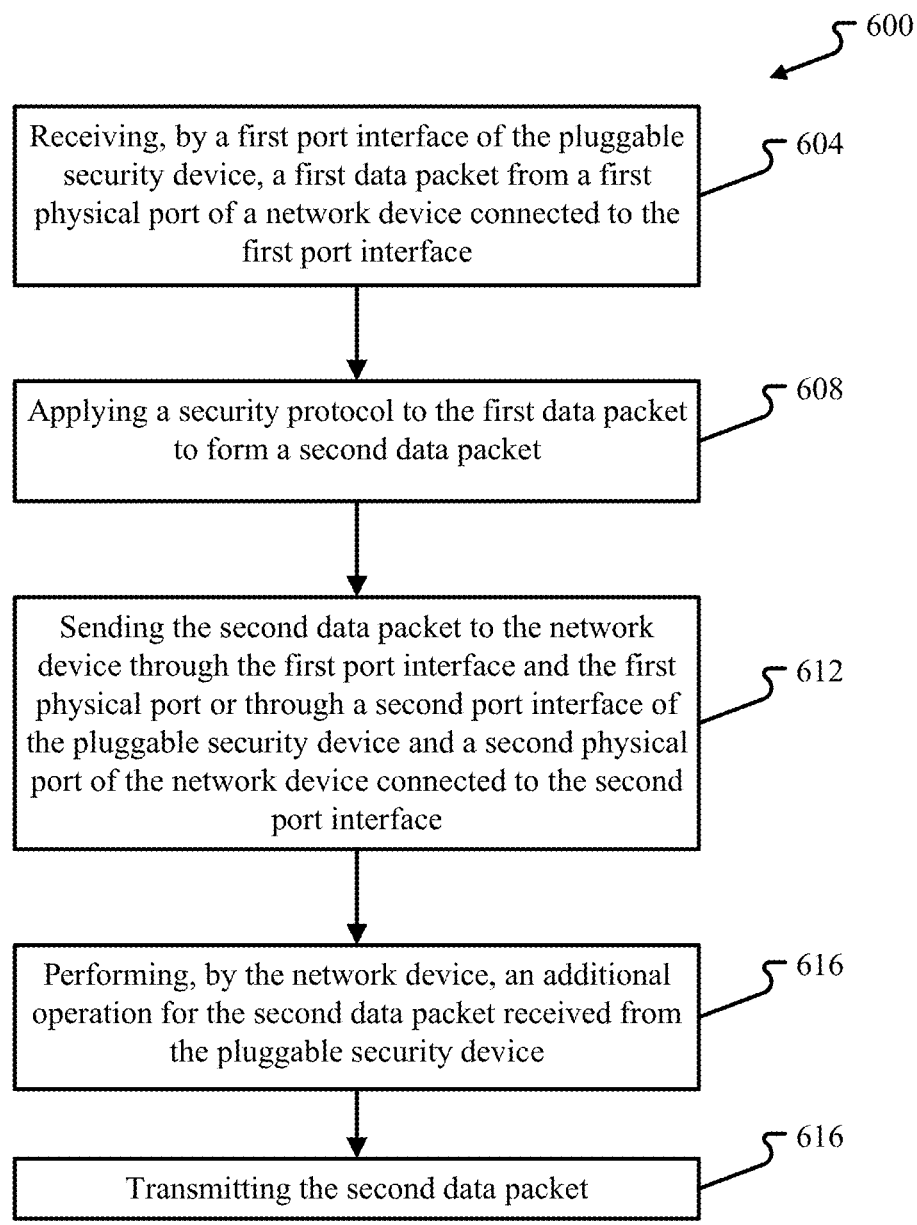
FIG. 6 illustrates a method for the system of FIG. 1 according to at least one example embodiment.

FIG. 6 illustrates a method 600 for the system of FIG. 1 according to at least one example embodiment. The method 600 is for securing data packet communication using a pluggable security device 108. Operations in the method 600 may be carried out by various elements of the system 100, for example, the network device 104 and/or the processing circuitry 120. Thus, FIG. 6 is described with reference to FIGS. 1 to 5C.

In operation 604, the method 600 includes receiving, by a first port interface (port A) of the pluggable security device 108, a first data packet from a first physical port (port 217) of a network device 104 connected to the first port interface.

In operation 608, the method 600 includes applying a security protocol to the first data packet to form a second data packet. In at least one example embodiment, for example, when the first data packet is unencrypted, then applying the security protocol in operation 608 includes increasing a size of the first data packet by one or more bits, and using the one or more bits to encrypt the first data packet according to the security protocol to form the second data packet as an encrypted version of the first data packet. This allows information associated with the security protocol to the second data packet, where such information may include a header or other data integrity bits.

In operation 612, the method includes sending the second data packet to the network device 104 through the first port interface (port A of the security device 108) and the first physical port (port 217) or through a second port interface (port B) of the pluggable security device 108 and a second physical port (port 218) of the network device 104 connected to the second port interface.

For example, as in FIG. 2, when the first data packet is unencrypted and the second data packet is an encrypted version of the first data packet formed by applying the security protocol, then the second data packet may be sent to the network device 104 through the first port interface (port A) of the pluggable security device 108 and the first physical port (port 217) of the network device. In another example and as in FIGS. 3 and 4, when the first data packet is unencrypted and the second data packet is an encrypted version of the first data packet formed by applying the security protocol, then the second data packet may be sent to the network device 104 through the second port interface (port B) of the pluggable security device 108 and the second physical port (port 218) of the network device 104.

In yet another example and as in FIG. 2, when the first data packet is encrypted and the second data packet is an unencrypted version of the first data packet formed by applying the security protocol, then the second data packet may be sent to the network device 104 through the first port interface (port A) of the pluggable security device 108 and the first physical port (port 217) of the network device 104. Still further and as shown in FIGS. 3 and 4, when the first data packet is encrypted and the second data packet is an unencrypted version of the first data packet formed by applying the security protocol, then the second data packet may be sent to the network device 104 through the second port interface (port B) of the pluggable security device 108 and the second physical port (port 218) of the network device 104.

Here, it should be appreciated that whether the first and second data packets traverse two total ports between the network device 104 and the security device 108 (e.g., port 217 of the network device 104 and port A of the security device 108) or four total ports between the network device 104 and the security device 108 (ports 217 and 218 of the network device and ports A and B of the security device 108) depends on the transmission capabilities of the system 100, such as the form factor(s) of the network device 104, transmission rate of the communication network 112, transmission rate between the network device 104 and the security device 108, and the like.

In operation 616, the method 600 includes performing, by the network device 104, an additional operation for the second data packet received from the pluggable security device 108. In at least one example embodiment, the additional operation includes encapsulating the second data packet according to a tunneling protocol or adjusting a data transmission rate of the second packet. It should be appreciated that the lookaside feature of inventive concepts enables the network device 104 to perform the additional operation of encapsulating the second packet, whereas related art systems use network switches or NICs do not allow such functionality because the MACsec encryption/decryption capabilities are built-in to the switch or NIC and connected as a bump in the wire and not as a lookaside.

In operation 620, the method 600 includes transmitting the second data packet through one of the ports of the network device 104 to the communication network 112 or to a host device or computer connected to the network device 104 depending on whether the second data packet is intended for a destination remote to the network device 104 or local to the network device 104.

In view of the foregoing, it should be appreciated that inventive concepts relate to, among other things, a pluggable security device for a network device such as a network switch or NIC. The pluggable security device offloads encryption and decryption operations from the network device and enables a lookaside feature that allows for the network device to further alter data before transmission (e.g., encapsulation). In addition, the pluggable security device offers the ability to turn a non-MACsec enabled device into a MACsec enabled device. These and other advantages should be apparent from the foregoing description.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

Example embodiments may be configured according to the following:

(1) A networking system, comprising:
  a pluggable security device, comprising:
    at least one port interface that is insertable into at least one physical port;
    memory that stores a security key used to provide security over a network link; and
    processing circuitry coupled with the at least one port interface and with the memory, wherein the processing circuitry utilizes the security key to verify security of a point-to-point connection established over the network link and after verifying the security of the point-to-point connection, provides a data integrity check function for data packets received at the at least one port interface.

(2) The networking system of (1), further comprising:
  the at least one physical port, wherein the at least one physical port comprises a first physical port and a second physical port, wherein the at least one port interface comprises a first port interface and a second port interface, wherein the first port interface plugs into the first physical port, wherein the second port interface plugs into the second physical port, and wherein the data packets traverse both the first physical port and the second physical port.

(3) The networking system of one or more of (1) to (2), wherein the processing circuitry provides the data integrity check function by appending a header to all data packets traversing the point-to-point connection established over the network link.

(4) The networking system of one or more of (1) to (3), wherein the processing circuitry provides the data integrity check function by inspecting a header of all data packets traversing the point-to-point connection established over the network link.

(5) The networking system of one or more of (1) to (4), wherein the processing circuitry further encrypts or decrypts data packets traversing the point-to-point connection established over the network link.

(6) The networking system of one or more of (1) to (5), wherein the network link comprises an Ethernet link or an Infiniband link.

(7) The networking system of one or more of (1) to (6), wherein the at least one physical port is provided in a network switch.

(8) The networking system of one or more of (1) to (7), wherein the at least one physical port is provided in a Network Interface Card (NIC).

(9) The networking system of one or more of (1) to (8), further comprising:
  a gearbox that adjusts a data transmission rate for data packets between the pluggable security device and the network link.

(10) The networking system of one or more of (1) to (9), wherein the pluggable security device further comprises an internal power source that is used to provide power to the processing circuitry.

(11) A method for securing data packet communication using a pluggable security device, comprising:
  receiving, by a first port interface of the pluggable security device, a first data packet from a first physical port of a network device connected to the first port interface;
  applying a security protocol to the first data packet to form a second data packet; and
  sending the second data packet to the network device through the first port interface and the first physical port or through a second port interface of the pluggable security device and a second physical port of the network device connected to the second port interface.

(12) The method of (11), wherein the first data packet is unencrypted and the second data packet is an encrypted version of the first data packet formed by applying the security protocol, and wherein the second data packet is sent to the network device through the first port interface of the pluggable security device and the first physical port of the network device.

(13) The method of one or more of (11) to (12), wherein the first data packet is unencrypted and the second data packet is an encrypted version of the first data packet formed by applying the security protocol, wherein the second data packet is sent to the network device through the second port interface of the pluggable security device and the second physical port of the network device.

(14) The method of one or more of (11) to (13), wherein the first data packet is encrypted and the second data packet is an unencrypted version of the first data packet formed by applying the security protocol, and wherein the second data packet is sent to the network device through the first port interface of the pluggable security device and the first physical port of the network device.

(15) The method of one or more of (11) to (14), wherein the first data packet is encrypted and the second data packet is an unencrypted version of the first data packet formed by applying the security protocol, and wherein the second data packet is sent to the network device through the second port interface of the pluggable security device and the second physical port of the network device.

(16) The method of one or more of (11) to (15), further comprising:
  performing, by the network device, an additional operation for the second data packet received from the pluggable security device.

(17) The method of one or more of (11) to (16), wherein the additional operation includes encapsulating the second data packet according to a tunneling protocol or adjusting a data transmission rate of the second packet.

(18) The method of one or more of (11) to (17), wherein the first data packet is unencrypted, and wherein applying the security protocol includes increasing a size of the first data packet by one or more bits, and using the one or more bits to encrypt the first data packet according to the security protocol to form the second data packet as an encrypted version of the first data packet.

(19) A pluggable security device, comprising:
  a first connector configured to electrically and mechanically connect to a first receiving portion of a network device;
  a second connector configured to electrically and mechanically connect to a second receiving portion of the network device; and
  processing circuitry to:
    apply an encryption/decryption protocol to data that secures the data over a point-to-point connection;

operate the pluggable security device in a first mode to send and receive both encrypted data and unencrypted data through only the first connector and the first receiving portion; and operate the pluggable security device in a second mode to send and receive encrypted data through only the first connector and the first receiving portion, and to send and receive unencrypted data and through only the second connector and the second receiving portion.

(20) The pluggable security device of (19), wherein the encryption/decryption protocol is MACsec protocol, and wherein the point-to-point connection is established with an Ethernet link.

What is claimed is:

1. A networking system, comprising:
a pluggable security device, comprising:
  a first port interface that is insertable into a first physical port of a network device to electrically and mechanically connect with the first physical port;
  a second port interface that is insertable into a second physical port of the network device to electrically and mechanically connect with the second physical port;
  memory that stores a security key used to provide security over a network link between the network device and another network device; and
  processing circuitry coupled with the memory, the first port interface, and the second port interface, wherein the processing circuitry utilizes the security key to verify security of a point-to-point connection between the network device and the another network device established over the network link and after verifying the security of the point-to-point connection, provides a data integrity check function for received data packets,
  wherein the processing circuitry operates in a first mode to send and receive unencrypted data packets and encrypted data packets to and from the network device through the first port interface, and
  wherein the processing circuitry operates in a second mode to send and receive encrypted data packets to and from the network device through the first port interface, and to send and receive unencrypted data packets to and from the network device through the second port interface.

2. The networking system of claim 1, wherein, in the first mode, the processing circuitry sends and receives unencrypted data packets and encrypted data packets to and from the network device through only the first port interface.

3. The networking system of claim 1, wherein the processing circuitry provides the data integrity check function by appending a header to data packets traversing the point-to-point connection established over the network link.

4. The networking system of claim 1, wherein the processing circuitry provides the data integrity check function by inspecting a header of data packets traversing the point-to-point connection established over the network link.

5. The networking system of claim 1, wherein, in the second mode, the processing circuitry sends and receives encrypted data packets to and from the network device through only the first port interface, and sends and receives unencrypted data packets to and from the network device through only the second port interface.

6. The networking system of claim 1, wherein the network link comprises an Ethernet link or an Infiniband link.

7. The networking system of claim 1, further comprising a network switch that includes the first and second physical ports.

8. The networking system of claim 1, further comprising a Network Interface Card (NIC) that includes the first and second physical ports.

9. The networking system of claim 1, further comprising:
a gearbox that adjusts a data transmission rate for data packets between the pluggable security device and the network link.

10. The networking system of claim 1, wherein the pluggable security device further comprises an internal power source that is used to provide power to the processing circuitry.

11. A pluggable security device, comprising:
a first connector configured to electrically and mechanically connect to a first receiving portion of a network device;
a second connector configured to electrically and mechanically connect to a second receiving portion of the network device; and
processing circuitry to:
  apply an encryption/decryption protocol to data that secures the data over a point-to-point connection;
  operate the pluggable security device in a first mode to send and receive both encrypted data and unencrypted data through only the first connector and the first receiving portion; and
  operate the pluggable security device in a second mode to send and receive encrypted data through only the first connector and the first receiving portion, and to send and receive unencrypted data and through only the second connector and the second receiving portion.

12. The pluggable security device of claim 11, wherein the encryption/decryption protocol is MACsec protocol, and wherein the point-to-point connection is established with an Ethernet link.

* * * * *